July 30, 1968   W. A. HERMANSON   3,395,025
CEREAL PACKAGE
Filed Aug. 21, 1964

INVENTOR
WILLIAM A. HERMANSON
BY,
Wolf, Greenfield & Hicken
ATTORNEYS

3,395,025
CEREAL PACKAGE
William A. Hermanson, 1284 Beacon St., Brookline, Mass. 02146
Filed Aug. 21, 1964, Ser. No. 391,100
2 Claims. (Cl. 99—171)

ABSTRACT OF THE DISCLOSURE

A heat sealable packaging material and disposable, boilable food packages for use in preparing hot boiled food products is provided. The disposable boilable food packages each comprise a permeable paper web forming a first side wall bonded to a second side wall by means of uniformly distributed polyethylene particles having a gradient of thermoplasticity no higher than 80° F. and a melting point of at least about 260° F.

---

The increasing popularity of quickly prepared, dry non-cooked cereals is believed to have adversely affected the sale of conventionally prepared boiled cereals such as oatmeal. Modern packaging has made possible the sale of individual portions of dry cereal in convenient throw-away containers which eliminates cleaning of dishes and cooking utensils. On the other hand, the packaging of boilable, hot cereals has not changed radically in recent years. Such hot cereals are in fact relatively more inconvenient to use than ever before in contrast to the improved packaged dry cereals.

Many people in the rush of modern-day pressures have given up boiled cereals because of the increased time and/or expense necessary for their preparation and subsequent relatively difficult cooking utensil cleanup. This is so even though such people would often prefer a hot cereal to a cold cereal particularly on cold winter days.

Aside from the decline in the use of hot cereals in the home, many commercial restaurants and snack bars discourage the sale of boiled cereals because of the time consuming cleanup of gluten containing cooking utensils used in their preparation and consumption. It is uncommon for commercial establishments to serve boiled cereals at meals other than breakfast at least partially because of the above problems.

It has now been found that preselected portions of boilable food products such as oatmeal can be stored in heat sealed permeable, boilable packages which can be immersed in boiling water or other liquid to cook the food after which the packages are retrieved, opened and the contents served. The packages are constructed to allow for rapid influx of the cooking liquid and preferably substantially prevent the glutens freed during the cooking process from passing out of the package into the cooking utensil containing the heated liquids. Thus, individual portions may be prepackaged if desired and cooking utensils used can be easily cleaned since large bodies of glutens are not freed to adhere to the side walls of cooking utensils used during the cooking process.

An important object of this invention is to provide an inexpensive, disposable, boilable, permeable package for use in storing and cooking food products.

Another important object of this invention is to provide a food package having heat sealed seams which package can be boiled in a liquid at temperatures at least as high as 212° F. without rupture of its seams. Seam rupture prevention is a significant consideration in such packages particularly since the contents of the packages often swell during the cooking process causing the hot contents to press outwardly and exert considerable stress on the heated seams.

Still another important object of this invention is to provide a package for gluten containing material which can be boiled in water and permits rapid passage of water or other liquids into the package while reducing passage of glutens to the surrounding water.

Still another important object of this invention is to provide a paper web having a coating thereover capable of being heat sealed to form strong, high temperature resistant bonds.

Still another important object of this invention is to provide a heat sealed seam which is inert to materials sealed therewith and does not impart a foreign taste to such materials.

According to the invention, a composite web is formed by coating a conventional thin, liquid permeable paper web with a substantially uniform thin layer of thermoplastic particles. Preferably the particles are heated to adhere them to the paper web without substantially blocking interfiber spaces between the cellulose fibers of the paper. In the preferred embodiment of this invention a package is formed by folding the coated paper web to form a bottom fold line and a first package side wall adjacent a second package side wall with their coated surfaces facing each other. Marginal edge portions of each side wall are heat sealed to each other and a final heat sealed step is performed to close the package after a food such as oatmeal is placed in a pouch formed between the two side walls.

In an alternate embodiment of the invention, a first thermoplastic particle coated web side wall is heat sealed to a second uncoated paper web side wall at marginal edges of the walls. This embodiment permits extremely rapid passage of cooking fluids through the second side wall since there are no thermoplastic particles which, to some small degree, can obstruct or decrease effective interfiber spaces in the paper web.

These and other features, objects and advantages of the invention will be better understood and appreciated from the following detailed description of one embodiment thereof selected for purposes of illustration and shown in the accompanying drawings, in which.

Figure 1:
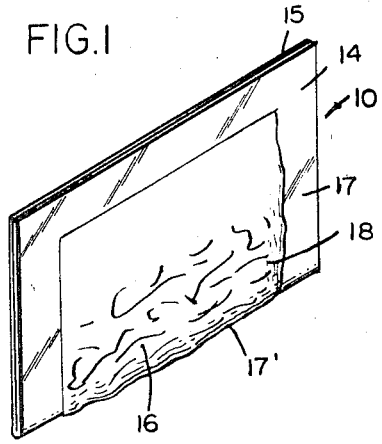
FIG. 1 is a perspective view of a preferred embodiment of an oatmeal package constructed in accordance with the present invention.
Figure 2:
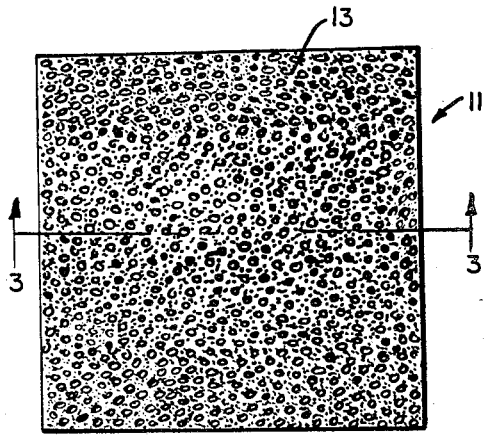
FIG. 2 is a top plan view of a thermoplastic particle coated paper web which forms the side walls thereof.
Figure 3:
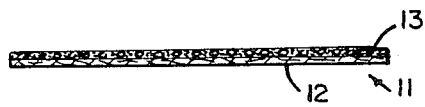
FIG. 3 is a cross sectional view taken through line 3—3 of FIG. 2.

With reference now to the drawings and in particular FIGS. 1–4, disposable heat sealed, boilable, low cost, permeable package 10 is shown containing dry, uncooked oatmeal 16 in a pouch 18. The package 10 has two side walls 14 and 15 integral with each other along a bottom fold 17' and sealed together at side and top marginal seams or edges 17 thereby defining an enclosed space formed by the pouch 18.

Figure 4:
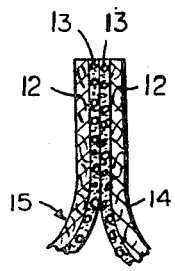
FIG. 4 is a fragmentary cross sectional view of a heat sealed seam thereof.

In the preferred embodiment of the oatmeal package 10, each of the rectangular side walls 14 and 15 are identical and are formed by folding over a composite coated paper web 11 with its coated surface in face to face contact. The composite coated web 11 comprises a first paper web layer 12 with a coating of thermoplastic polyethylene particles 13 substantially uniformly coated over an upper surface. The layer of polyethylene particles on facing surfaces of side walls 14 and 15 provide a means for heat sealing the bag 10 together at its marginal seams 17 as shown in FIGS. 1 and 4.

The paper web 12 is preferably a thin, non-self supporting cellulose fiber containing, absorbent, permeable paper web. Preferably cellulose fibers which make up the paper web 12 have interfiber openings or spaces therebetween ranging in size from about 5 to about 150 microns and a base weight (24 x 36–480, i.e., 480 sheets having a width of 24 inches and a length of 38 inches) of from 5 to 10 pounds. Preferably the paper is treated in a conventional manner to increase wet strength and can have incorporated therein melamine formaldehyde or other conventional wet strength means.

Stretchable papers such as conventional crepe paper or "Clu-pak" paper which can stretch up to 20% without losing its recovery properties are also suitable for use in this invention.

The coated layer of discrete, generally spherical or irregular, nonelongated particles 13 is preferably made of ground polyethylene particles which pass through screens of down to approximately 120 mesh corresponding to particle sizes of from 8 to 125 microns. The polyethylene particles 13 preferably have a softening point of from 180° F. to 200° F. and a melting point of 260° F. to 280° F. The gradient of thermoplasticity of the polyethylene particles is preferably no higher than 80° F., i.e. the point at which the particles soften (which is defined as the point at which they lose their resiliency or distort) and the melting point of the particles, are preferably no more than 80° F. apart. This feature in combination with the high melting points of the particles is believed to be responsible for causing heat sealed bags in accordance with this invention to resist rupture of seams at temperatures at least as high as 212° F. and often well above this temperature.

The polyethylene particles used are inert to water and most cooking liquids used with the food packages of this invention. The polyethylene particles are also inert to the oatmeal or other foods used and to the side walls of cellulose fibers as well as to most conventional wet strength resins. Thus, the particles do not impart any foreign taste to the contents of the package or to the liquids in which they can be boiled or heated.

Preferably the polyethylene particles are deposited on one surface only of the permeable paper web 12 by conventional spraying methods or by uniformly sifting to deposit a preferred weight of particles to paper in a ratio of from approximately 1:2½ to 1:5 on one surface of the web. It is preferred to coat the layer of particles on the paper web after it has been formed dry rather than during the manufacture of the paper web when it is wet to avoid substantial blocking of interfiber openings or passage of the particles to the second underlying surface of the web. After one surface of the paper web has been uniformly covered with the desired amount of particles, the opposite surface of the paper is passed over a heated surface above the melting point of the particles for an extremely short period of time to bond the particles to the paper web.

The particular melting point of the polyethylene particles 13 affects the bond strength at the seams 17. Higher melting point polyethylene particles give stronger bonds than lower melting point particles. The amount of polyethylene particles used also affects the bond strength and is varied depending upon the strength of the heat sealed bonds at the seams required by the weight of the substances enclosed in the bag.

The food packages 10 can be manufactured, using conventional heat sealing and filling machines, from elongated strips of composite webs such as 11. Automatic heat sealing and feeding machines such as Bartlett machines having a gravity feed can be used to fold over a strip of the composite web 11 upon itself, fill a pouch 18 with oatmeal and seal seams 17. Preferably sealing temperatures of from 275° to 375° F. for time periods of from 0.5 to 0.24 second under pressures of 25 to 100 pounds per square inch are used. However, the specific ranges given can vary considerably depending on the particular package sizes and particles used.

In a specific example of the preferred embodiment of this invention, an oatmeal package was formed by employing a paper web 12 having a base weight (24 x 36–480) of 7¼ pounds and an interfiber space size varying from 5 to 150 microns. The paper web was coated on one surface with polyethylene particles, having a size of 105 microns, in amounts of 1338 grams of polyethylene particles to 2880 square feet of paper web. The polyethylene particles had a melting point of between 260° F. to 280° F. and a gradient of thermoplasticity of 80° F. The polyethylene particles were sifted onto one surface of the paper web and the second surface of the web was passed over a heated surface above the melting point of the polyethylene particles. An elongated strip of the composite web 11 formed was then passed through a conventional Bartlett automatic heat sealing and filling machine where 1¼ ounces of dry oatmeal was successively enclosed in successive oatmeal packages 10 forming having dimensions of 4¾ inches by 5¼ inches. The process was run continuously at high rates of speed. The heating time for the sealed seams 17 which is approximately 1/16 inch in width was 0.5 second at a temperature of 350° F.

Ten sample oatmeal packages produced were placed in a cooking vessel filled with boiling water for ten minutes. None of the seams 17 ruptured, even though the oatmeal within the packages swelled considerably and exerted a positive pressure outwardly tending to pull the seams apart. The oatmeal packages were then taken out of the boiling water, torn by hand and the contents placed in bowls. The torn side walls were discarded. The cooked oatmeal was highly appetizing and did not contain foreign or undesirable tastes. Morevoer, the cooking utensil did not have any substantial amount of glutens adhered to its side wall and was easily cleaned.

It has been found that oatmeal in packages of this invention may be cooked for periods of time ranging from five to fifteen minutes and longer at temperatures of at least 212° F. and above without rupture of the package seams.

Figure 5:
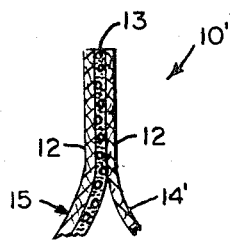
FIG. 5 is a fragmentary cross-sectional view of a heat sealed seam in accordance with an alternate embodiment of this invention.

In an alternate embodiment of this invention, only one side wall 15 of the composite sheet 11 is coated with polyethylene particles. Thus, the composite sheet 11 comprises a longitudinally extending strip of paper web 12 having a surface with one longitudinally extending half of the surface coated with polyethylene particles and the second longitudinally extending surface half having no coating. The composite sheet 11 is folded over at its longitudinally extending center line to form a package such as 10'. The package 10' is identical to package 10 except for side wall 14' not having a polyethylene particle coating. In this case, the seam 17 formed, shown in cross section at FIG. 5 has only a single polyethylene layer as previously described heat sealed to seal the paper webs 12. This embodiment provides the advantage of having an uncoated permeable paper web side wall 14' which allows extremely rapid influx of water into the package since none of the interfiber spaces are partially blocked by polyethylene particles. It is stressed that the polyethylene particles 13 do not substantially inhibit passage of water but do slow the passage of water to some small extent.

In still other embodiments of this invention, the side walls such as 14 and 15 may comprise separate sheets of paper webs such as 11 which are joined together to form a continuous rectangular heat sealed marginal edge or seam 17 completely around the pouch 18 formed without a folded over bottom fold edge 17'. In such cases conventional Stokes and Smith heat sealing and filling machines may be employed to successively manufacture packages at high production rates. It is possible to have the advantages of the embodiment of FIG. 5 when two discrete paper web side walls are used by forming one paper web side wall with a polyethylene coating and heat sealing the polyethylene coated surface of the first side wall to a second side wall paper web which is not coated with polyethylene particles. In other cases only the peripheral facing edge portions of the side walls at seams 17 are treated by coating with polyethylene particles and the pouch forming portions of the side walls are uncoated on both surfaces.

While the layer of polyethylene particles is referred to as a coating throughout the specification, it should be clearly understood that the coating is discontinuous to promote permeability.

While specific embodiments of this invention have been shown and described, is should be understood that many variations thereof are possible. For example, the particular configuration of the food packages may vary considerably with rectangular, circular, hexagonal or other peripheral side wall shapes being possible. More than two side walls may be used and the heat sealable polyethylene particle layer may be used as a bonding means for forming seams or joints wherever desired. Tabs or strings may be attached to or sealed partially within the seams 17 to facilitate handling the packages of this invention.

Therefore, this invention is to be limited only by the spirit and scope of the appended claims.

What is claimed is:

1. A disposable, boilable cereal package containing a serving of said cereal in dry form, said package comprising,
   a first water permeable side wall formed of a composite permeable paper web having a coating of heat sealable, polyethylene particles having a size in the range of from 8 to 125 microns, a gradient of thermoplasticity no higher than 80° F., a softening point of at least 180° F. and a melting point of at least 260° F. on a first surface,
   a second side wall formed of a permeable paper web,
   said second side wall being heat sealed to said first side wall at the marginal edges thereof by said polyethylene particles with said first surface facing said second side wall,
   said first and second side walls defining a pouch therebetween contaniing said oatmeal,
   said paper webs having a base weight 24 x 36–480 of from 5 to 10 pounds whereby cooking liquids can easily pass through said side walls to said oatmeal.

2. A boilable cereeal package in accordance with claim 1 wherein said first and second side walls are integral at a marginal edge fold line and heat sealed at a marginal seam continuous with said fold line by said polyethylene particles.

References Cited

UNITED STATES PATENTS

| | | | |
|---|---|---|---|
| 2,306,400 | 12/1942 | Menzel | 117—16 |
| 2,909,443 | 10/1959 | Wolinski | 99—171 |
| 3,081,174 | 3/1963 | Gay | 99—171 |

FOREIGN PATENTS

| | | |
|---|---|---|
| 482,583 | 4/1952 | Canada. |
| 887,215 | 1/1962 | Great Britain. |

HYMAN LORD, *Primary Examiner.*